United States Patent [19]

Takacs et al.

[11] 4,118,138

[45] Oct. 3, 1978

[54] CUTTING TOOL

[75] Inventors: Victor C. Takacs; Joseph E. Takacs, both of Houston, Tex.

[73] Assignee: Triangle Grinding, Inc., Houston, Tex.

[21] Appl. No.: 806,146

[22] Filed: Jun. 13, 1977

[51] Int. Cl.² ............................................. B26D 1/12
[52] U.S. Cl. .................................. 407/112; 407/101; 407/117
[58] Field of Search ............... 407/109, 112, 117, 101

[56] References Cited

U.S. PATENT DOCUMENTS

| | | | |
|---|---|---|---|
| 3,109,232 | 11/1963 | Melvin | 407/117 |
| 3,205,557 | 9/1965 | Frommelt et al. | 407/109 |
| 3,534,457 | 10/1970 | Mueller | 407/112 |
| 3,774,276 | 11/1973 | Eckle | 407/109 |
| 3,825,981 | 7/1974 | Cochran et al. | 407/112 |
| 3,844,008 | 10/1974 | Sletten | 407/117 |
| 3,939,539 | 2/1976 | Novak | 29/96 |

FOREIGN PATENT DOCUMENTS 989,133  4/1965  United Kingdom ................. 29/96

Primary Examiner—Harrison L. Hinson
Attorney, Agent, or Firm—Bill B. Berryhill

[57] ABSTRACT

A cutting tool which may comprise: an elongated bar member; an anvil member removably fastened to one end of the bar member and having an elongated recess in which a cutting insert may be received; and a clamp member removably fastened to the anvil member for rigidly clamping the cutting insert in the elongated recess. The elongated bar member and anvil member may be provided with cooperating key and keyway by which the anvil member is at least partially affixed to the bar member in a predetermined rigid position.

18 Claims, 9 Drawing Figures

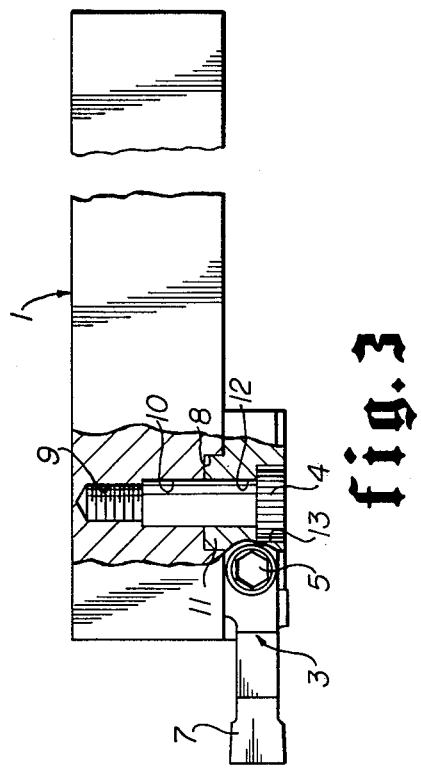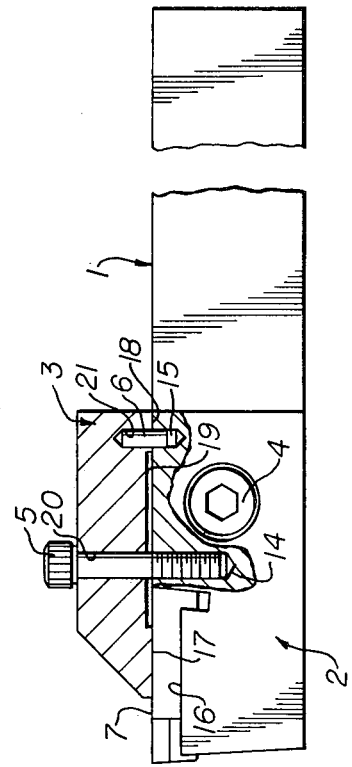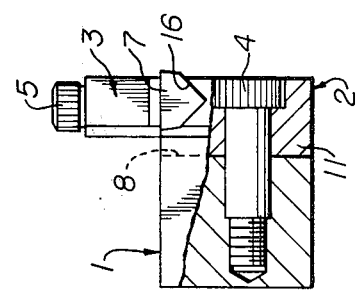

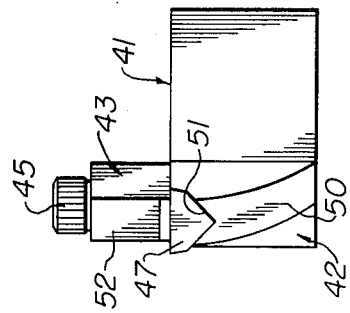
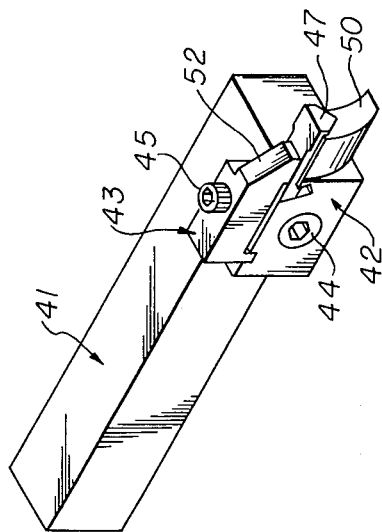
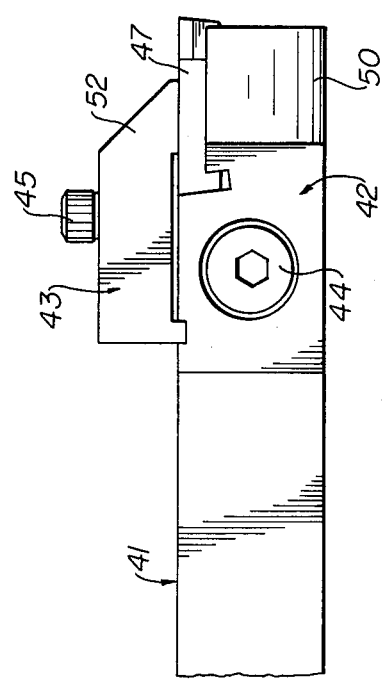
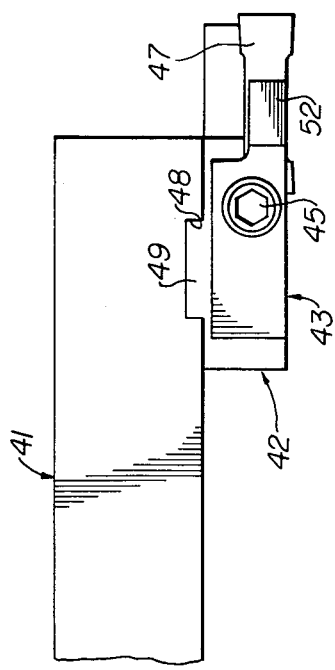

CUTTING TOOL

BACKGROUND OF THE INVENTION

1. Field of the Invention

The present invention pertains to cutting tools for machining and finishing metal. More specifically, it pertains to cutting tools especially adapted for deep grooving and profiling of metal.

2. Brief Description of the Prior Art

Metal cutting tools have been in existence for many years. It is a common practice to fasten the metal part to be machined in a chuck or vise, to fasten a cutting tool to a stationary tool post of the machine and to rotate the chucks relative to the tool. In such use, the tool may include an elongated bar at the end of which is attached in some fashion a replaceable cutting insert. When the cutting insert is broken or worn, it may be removed and replaced with a new or sharpened cutting insert without having to replace the more expensive bar.

Some of the cutting bars of the prior art are provided with an anvil having a recess or groove in which the cutting insert may be received and by which the cutting insert may be clamped between the anvil and the bar. Some of these anvils are integrally formed with the bar. However, the anvil is subjected to stress and wear and may be broken or, after extended use, may be worn beyond further use. If the anvil is integral with the bar, this would necessitate the relatively expensive proposition of replacing the entire bar.

To eliminate replacement of cutting tool bars, two-piece bar and anvil tools have been developed in which a broken or worn anvil may be replaced without having to replace the entire bar. However, many two-piece tools are not as rigid as desired. Poor rigidity characteristics may result in inferior machining through chatter and may even result in frequent breakage of cutting inserts and anvils. This is particularly true for tools used in deep grooving, profiling and trepanning, a term sometimes used for face grooving.

SUMMARY OF THE INVENTION

In the present invention, a cutting tool of multiple piece construction is provided. The tool may include a bar member, an anvil member and a clamp member. The anvil member is removably fastened to one end of the bar member and may be provided with an elongated recess in which a cutting insert may be received. The clamp member may be removably fastened to the anvil member for rigidly clamping a cutting insert in the elongated recess of the anvil member.

A high degree of rigidity is obtained by providing a key on the anvil member or bar member and a cooperating keyway on the other. The key and keyway arrangement, in combination with the design of the clamp member, provides rigidity characteristics superior to cutting tools of the prior art.

The multiple bar anvil and clamp construction allows replacement of worn or broken anvils without having to replace the bar member. In addition, replacement of worn cutting inserts is easy and quick. Furthermore, the cutting tool of the present invention is very economical to manufacture.

Several variations of the invention will be described hereafter. Many other variations will be apparent to those skilled in the art from reading the description which follows in conjunction with the accompanying drawings.

Brief Description of the Drawings

FIG. 2 is a side view, partially in section, of the embodiment of FIG. 1;

FIG. 3 is a top view, partially in section, of the embodiment of FIGS. 1 and 2;

FIG. 4 is an end view, partially in section, of the embodiment of FIGS. 1, 2, and 3;

FIG. 6 is a perspective view of still another alternate embodiment of the invention;

FIG. 7 is a side view of the embodiment of FIG. 6;

FIG. 8 is a top view of the embodiment of FIGS. 6 and 7; and

FIG. 9 is an end view of the embodiment of FIGS. 6, 7 and 8.

Description of Preferred Embodiments

Figure 1:
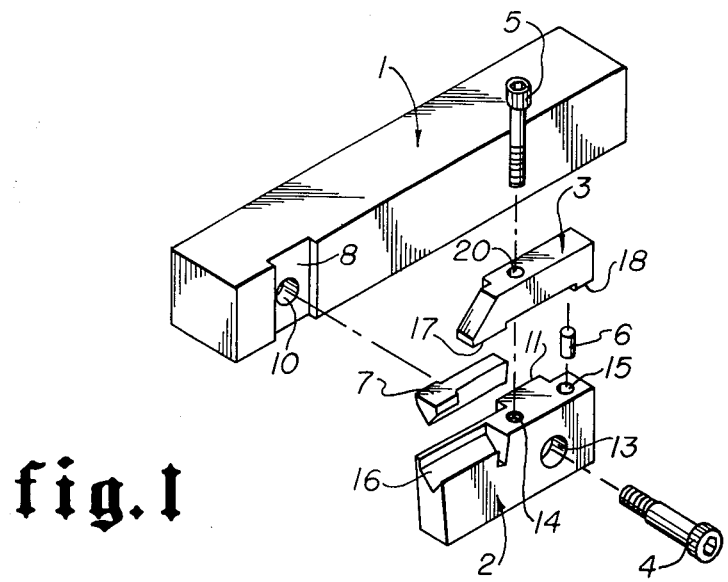
FIG. 1 is an exploded perspective view of a preferred embodiment of the invention.

Referring first to FIGS. 1 through 4, there is shown a cutting tool, according to a preferred embodiment of the invention, having three major assemblies: an elongated bar member 1, an anvil member 2, and a clamp member 3. The tool also includes a shoulder screw 4, cap screw 5, pin 6 and may include a cutting insert 7.

As shown, the bar member 1 is preferably square or rectangular in cross section and is provided with a keyway 8 in one of its sides. When the bar member 1 is disposed as it normally would be for cutting, the keyway 8 is vertical. Communicating with the keyway 8 and mutually perpendicular thereto is a bottom threaded hole 9 having a smooth counterbore 10 of slightly larger diameter.

The anvil member 2 is essentially rectangular in shape, but provided along one side thereof with a vertical key 11 for close tolerance mating with the keyway 8 of bar member 1. Drilled through anvil member 2 and the key 11 is a hole 12 for coaxial alignment with the counterbore 10 of bar member 1. The anvil member hole is counterbored at 13 to provide a larger diameter bore for receiving the head of shoulder screw 4.

Also provided in the anvil member 2, perpendicular to the axis of hole 12, is a threaded hole 14 and a smooth hole 15. The threaded hole 14 is for receiving cap screw 5 and the smooth hole 15 is for receiving pin member 6 which would normally be carried by clamp member 3.

The anvil member 2 is provided with an elongated, preferably V-bottom, recess 16, in which the cutting insert 7 would normally be disposed. In the embodiment of FIGS. 1 through 4, the axis of the elongated recess is substantially parallel but offset to one side from the longitudinal axis of the bar member 1.

The clamp member 3, rectangular-like in construction and as shown in FIGS. 1 through 4, may be provided with a downwardly facing first flat surface 17, and a downwardly facing second flat surface 18, separated by a relieved or recessed surface 19. The first flat surface 17 is adapted for bearing against cutting insert 7 while the second flat surface 18 is adapted to bearing against anvil member 2.

The clamp member 3 may be provided with a hole 20 for coaxial alignment with the threaded hole 14 of anvil member 2 and through which the cap screw 5 may be inserted for engagement with the threaded hole 14 or anvil member 2. A hole 21 may also be provided in the clamp member 3 for insertion of pin member 6 and obviously should be coaxially aligned with the hole 15 provided in anvil member 2.

To assemble the tool, the anvil member 2 is placed adjacent bar member 1 with the key 11 and keyway 8 in mutual engagement and with the smooth bores 10 and 12 in coaxial alignment. The shoulder screw 4 is inserted for threaded engagement with bottom threaded hole 9. The close tolerance fit between the key 11 and keyway 8 and between shoulder screw 4 and smooth bores 10 and 12 of the bar member 1 and anvil member 2, respectively, assures a very rigid attachment.

Next, an insert 7 can be placed in the elongated recess 16 of anvil member 2 and the clamp member 3 placed in position with the pin 6 engaging anvil member hole 15. Cap screw 5 is then inserted through clamp member hole 20 for engagement with threaded hole 14 of anvil member 2. Tightening of the cap screw 5 securely and rigidly clamps the cutting insert 7 in place and the tool is ready for use. To replace insert 7, the cap screw 5 need not be completely removed, but need only be loosened to the extend necessary to remove cutting insert 7 and insert a new one.

Figure 5:
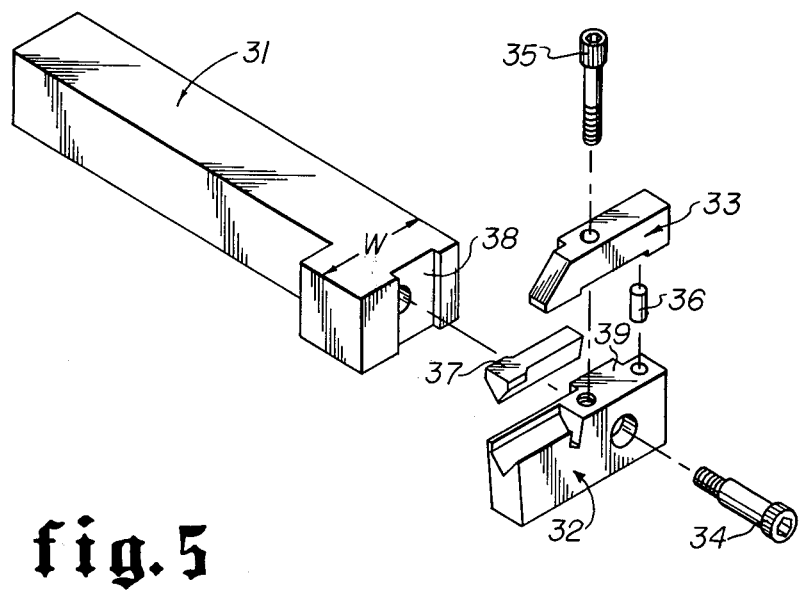
FIG. 5 is an exploded perspective view of a cutting tool according to an alternate embodiment of the invention.

Referring now to FIG. 5, an alternate embodiment of the invention is shown, in which the anvil 32 and clamp member 33 are mounted on the end of bar member 31 so that the axis of the cutting insert 37 to be held thereby is substantially perpendicular to the longitudinal axis of the bar member 31. This embodiment of the cutting tool of the present invention is particularly designed for internal grooving, although it can also be used for external grooving.

Like in the previous embodiment, the bar member 31 and anvil member 32 are provided with cooperating key and keyway 39 and 38, respectively. However, for the perpendicular mounting of this embodiment, the keyway 38 is machined in the end of the bar member 31. In addition, to provide extra rigidity, the width of the bar member 31 may be increased as shown by the dimension w.

Like in the previous embodiment, this embodiment is also provided with a shoulder screw 34, cap screw 35, alignment pin 36, etc. Other than being mounted on the end of bar member 31, this embodiment is substantially the same as the previously described embodiment. Both embodiments of FIGS. 1–4 and FIG. 5 can be provided with opposite hand anvils.

Referring now to FIGS. 6–9, still another embodiment of the invention is shown which is particularly designed for face grooving or trepanning, i.e., cutting a circular groove in the end of a part. Like in the embodiment of FIGS. 1–4, a bar member 41, anvil member 42, and clamp member 43 is provided. The particular embodiment illustrated in FIGS. 6–9 is one having a lefthand anvil in contrast to the righthand anvil of the embodiment of FIGS. 1–4. However, with a groove in the opposite side of the bar member 41, a righthand anvil may also be used. Like in the previous embodiments, a shoulder screw 44 is provided to attach the anvil member 42 to the bar member 41. A cap screw 45 attaches the clamp member 43 to the anvil member 42 so that a cutting insert 47 may be rigidly clamped to the anvil member 42. A vertical keyway 48 and key 49 are provided by the bar member 41 and anvil member 42 to assure rigid connection of these two members, as in previously described embodiments.

There is one difference in the clamp and anvil members of the embodiments of FIGS. 6–9. Since this particular tool is for cutting a circular groove, it is desirable to provide an arcuate support rib 50 directly below the cutting insert 47. In fact, the upper edge of the support rib 50 forms at least a portion of the elongated recess in which the cutting insert 47 is disposed. The lower edge of the support rib 50 terminates at the lower edge of the anvil member 42. The center of curvature of the arcuate support rib 50 lies on an axis parallel to the longitudinal axis of the elongated recess 51 in which the cutting insert 47 rests. It will be noted that to allow for the arcuate support rib 50, the width of the anvil 42 is greater than the width of the anvil for the previous embodiments. Accordingly, the width of the clamp member 43 may be increased except directly above the insert 47 where the clamp member 43 forms a more narrow projection 52.

The assembly of the embodiment of FIGS. 6–9 is similar to the assembly of the previously described embodiments. All of the embodiments described provide flexibility by allowing for interchangeable anvils for varying groove widths and for righthand and lefthand cutting.

The cutting tool design of the present invention provides greater rigidity than deep groove cutting tools of the prior art. The strong vertical key and keyway construction allows heavier cutting feeds with less chatter. Quick and easy anvil replacement is achieved through the use of one shoulder screw for anvil location and seating. For deep grooving or trepanning, the cutting tool of the present invention is unexcelled.

Although several embodiments of the invention have been described herein, many other variations can be made without departing from the spirit of the invention. Therefore, it is intended that the scope of the invention be limited only by the claims which follow.

We claim:
1. A cutting tool comprising:
    an elongated bar member;
    an anvil member removably fastened to one end of said bar member and having an elongated recess in which a cutting insert may be received; and
    a clamp member removably fastened to said anvil member for rigidly clamping said cutting insert in said elongated recess;
    said bar member being provided with a bottom threaded hole having a smooth counterbore of larger diameter, said anvil member being provided with a smooth bore hole of substantially the same diameter of said counterbore;
    said anvil member being at least partially fastened to said bar member by a screw member having a threaded end for engagement with the threaded portion of said threaded hole and a smooth cylindrical portion for disposition within said smooth counterbore and said anvil member smooth bore hole.

2. A cutting tool as set forth in claim 1 in which said elongated bar member and said anvil member are provided with cooperating key and keyway means by which said anvil member is at least partially affixed to said bar member in a predetermined rigid position.

3. A cutting tool as set forth in claim 2 in which the longitudinal axes of said key and keyway means is perpendicular to the longitudinal axis of said elongated recess of said bar member.

4. A cutting tool as set forth in claim 2 in which said anvil member is fastened on the side of said bar so that the axis of said elongated recess is parallel to the longitudinal axis of said bar member.

5. A cutting tool as set forth in claim 2 in which said anvil member is fastened to the end of said bar member so that the axis of said elongated recess is substantially perpendicular to the longitudinal axis of said bar member.

6. A cutting tool as set forth in claim 2 in which the lower surfaces of said clamp member comprise a first flat surface separated from a second flat surface by a recessed surface, said first flat surface for bearing against said cutting insert and said second flat surface for bearing against said anvil member, said clamp member being fastened to said anvil member by a screw passing through said clamp member for threaded engagement with a threaded hole in said anvil member.

7. A cutting tool as set forth in claim 6 in which each of said clamp and anvil members are provided with coaxial holes in which a pin member is disposed for properly predetermined registration and alignment of said clamp member relative to said anvil member.

8. A cutting tool as set forth in claim 4 in which said anvil member comprises an arcuate support rib the upper edge of which forms a portion of said elongated recess, the lower edge of which terminates at the lower edge of said anvil member.

9. A cutting tool as set forth in claim 8 in which the center of curvature of said arcuate rib lies on an axis parallel to said longitudinal axis of said elongated recess.

10. A cutting tool comprising:
    an elongated bar member having keyway means at one end thereof whose longitudinal axis is substantially perpendicular to the longitudinal axis of said bar member;
    an anvil member removably fastened at said one end of said bar member having key means for engaging said bar member keyway means and having an elongated recess in which a cutting insert may be received;
    fastener means for removably fastening said anvil member to said bar member, said fastening means and said key and keyway means cooperating to rigidly affix said anvil member to said bar member; and
    clamp means removably fastened to said anvil member for rigidly clamping said cutting insert in said elongated recess;
    said fastener means comprising a first hole in said bar member, a coaxially aligned smooth bore second hole through said anvil member and a screw member, the bottom of said first hole being threaded and the top of said first hole being counterbored to provide a smooth counterbore of substantially the same diameter of said second hole, the end of said screw member being correlatively threaded to engage said threaded bottom of said first hole, the remaining shank of said screw having a smooth cylindrical surface for close tolerance disposition within said first hole counterbore and said second hole.

11. A cutting tool as set forth in claim 10 in which said keyway means lies along one side of said bar member so that the axis of said elongated anvil member recess is substantially parallel to said longitudinal axis of said bar member but spaced therefrom.

12. A cutting tool as set forth in claim 11 in which said anvil member includes an arcuate rib the upper edge of which forms a portion of said elongated recess, the center of curvature of said arcuate rib lying on an axis parallel to said longitudinal axis of said elongated recess but spaced therefrom.

13. A cutting tool as set forth in claim 9 in which said keyway means lies at the end of said bar member so that the axis of said anvil member recess is substantially perpendicular to said longitudinal axis of said bar member.

14. A cutting tool as set forth in claim 10 in which said first and second hole pass through said key and keyway means perpendicular to the longitudinal axes thereof.

15. A cutting tool as set forth in claim 14 in which said clamp means comprises a clamp member, one end of which bears against said anvil member and the other end of which is adapted for bearing against a cutting insert when received in said elongated recess, and a fastener device for fastening said clamp member to said anvil member.

16. A cutting tool as set forth in claim 15 in which the lower surface of said clamp member is relieved between said ends.

17. A cutting tool as set forth in claim 15 in which said clamp member and said anvil member are provided with cooperating alignment means for properly aligning said clamp member relative to said elongated recess.

18. A cutting tool comprising:
    an elongated bar member having keyway means along one side and at one end thereof whose longitudinal axis is substantially perpendicular to the longitudinal axis of said bar member;
    an anvil member removably fastened at said one end of said bar member having key means for engaging said bar member keyway means and having an elongated recess, in which a cutting insert may be received, whose axis is substantially parallel to said longitudinal axis of said bar member but spaced therefrom;
    said anvil member including an arcuate support rib the upper edge of which forms at least a portion of said elongated recess, the lower edge of which terminates at the lower edge of said anvil member;
    fastener means for removably fastening said anvil member to said bar member, said fastening means and said key and keyway means cooperating to rigidly affix said anvil member to said bar member; and
    clamp means removably fastened to said anvil member for rigidly clamping said cutting insert in said elongated recess.

* * * * *